United States Patent [19]

Tezuka

[11] Patent Number: 4,610,926
[45] Date of Patent: Sep. 9, 1986

[54] CONCRETE REINFORCING STEEL FIBERS AND PRODUCTION THEREOF
[75] Inventor: Yoshitomo Tezuka, Tokyo, Japan
[73] Assignee: Tokyo Rope Manufacturing Co., Ltd., Tokyo, Japan
[21] Appl. No.: 573,925
[22] PCT Filed: Apr. 14, 1983
[86] PCT No.: PCT/JP83/00115
  § 371 Date: Dec. 16, 1983
  § 102(e) Date: Dec. 16, 1983
[87] PCT Pub. No.: WO83/03602
  PCT Pub. Date: Oct. 27, 1983
[30] Foreign Application Priority Data
  Apr. 16, 1982 [JP] Japan .................... 57-62502
[51] Int. Cl.⁴ .................... B32B 3/02; D02G 3/00
[52] U.S. Cl. .................... 428/399; 428/397; 428/400
[58] Field of Search .................... 428/399, 400, 397

[56] References Cited
U.S. PATENT DOCUMENTS
4,054,993 10/1977 Kamp et al. .................... 428/399
4,229,501 10/1980 Kern .................... 428/400
4,233,364 11/1980 van Thiel .................... 428/399

Primary Examiner—Paul J. Thibodeau
Attorney, Agent, or Firm—Michael J. Striker

[57] ABSTRACT

A reinforcing steel fiber of the type to be mixed in concrete has a shaft portion at a center part, which has strength as a mother material. There are on both sides of the shaft portion, alternately formed knots expanding in thickness and knots expanding in width. The knots expanding in width become increased in width in the direction towards the ends of the fiber while they become decreased in thickness while knots expanding in thickness extend almost uniformly over the full length.

6 Claims, 18 Drawing Figures

CONCRETE REINFORCING STEEL FIBERS AND PRODUCTION THEREOF

TECHNICAL FIELD

Proposed are concrete reinforcing steel fibers, especially steel fibers of particular shape produced from war materials of fine wires, and a producing process thereof.

BACKGROUND OF THE INVENTION

Steel fibers of 0.1 to 0.4 mm² in cross sectional area and 20 to 40 mm in length have been employed for improving characteristics of concrete structures or concrete products such as cracks, tension and others. Known reinforcing steel fibers are those of cut wire type produced from steel wires, sheared fiber type from thin sheet, machined fiber type from thick plate, and ME fiber type directly extracted from molten steel. Among them, in the cut wire type, cold drawn materials could be used as they are and tensile strength thereof is more excellent than others.

However, since the cut wire type has in general smooth circular cross section, it has demerits that ratio of the surface area is small and adhesive strength with concrete or mortar is low (only drawing resistance by friction). For countermeasure to those demerits, the prior art has made concaves and convexes equidistantly over the full length of the fiber. However although such considerations are made on the fibers but if their cross sections were uniform in width or thickness, adhesion would not increase satisfactorily. If the adhesion were increased by elaborating said considerations and the fibers had uniform tensile strength over the full length, and if the concrete were subjected to external actions such as bendings or tension, combination of the fibers and the concrete matrix would be broken at once. Thus, the high tensile strength would turn out rather harmful causes and invite abrupt changing in load of the concrete structure.

Further, there has been a technique which bends the fibers in trapezoid  in cross section, but this technique is inferior in workability at mixture and easily makes fiber balls. In addition, such fibers are easily broken at bending portion.

With respect to the steel fibers depending upon the conventional wire cut type, an ingot is passed through a rough roll to reduce the diameter to 5 or 6 mm, and through a drawing die of multi-steps, i.e. a die formed with tapering hole or roll die.

This process positions a tension step by means of a coiling roll such as capstans or drums, per each of the drawings, and therefore since a stretching process is discontinuous, the processing efficiency is lowered and reduction of cross section could not be made much as well. Besides, the rolling depends upon the tension system so that drive force is made large and an intermediate coiling is necessary, so that the apparatus is large scaled and complicated as a whole. Therefore, the fiber production is lower in efficiency, but high in producing cost.

SUMMARY OF THE INVENTION

The present invention has been devised to remove defects involved about the conventional steel fibers.

An object of the invention is to provide concrete reinforcing steel fibers of wire cut type, in which adhesion strength of the concrete is large than tensile strength of the fiber, and with which reinforced concrete of high toughness may be obtained without generating of abrupt changing in load, and breaking of combination of the fibers and the concrete matrix when the concrete is destructed.

A second object of the invention is to provide a process of producing steel fibers of wire cut type, with which the steel fibers having the above mentioned characteristics may be easily produced at high efficiency, and the production cost is largely lowered.

For accomplishing the objects, the invention keeps a shaft portion for changing elongation, which has strength equivalent to that of a mother material, remaining on a central part of a fine fiber of determined length, and forms a plurality of hard knots in such a manner that those knots alternately protrude in thickness (vertical) and width (lateral), and the protruding amount becomes gradually larger as going towards the ends of the fiber.

According to the steel fibers of such structure, the knots protruding in thickness and width make the surface area larger, and since the knots become larger and harder as going to the ends of the fibers, the adhesive strength of the concrete is high and the drawing resistance becomes higher due to anchoring effect thereof. The fiber has the shaft portion in length at its center, which is rigid but easily elongated and, when load is subjected, which serves as slipping and is deformed due to elongation. Since the shaft portion becomes thin and is broken by the load, the combination between the anchoring portion and the concrete matrix are exactly maintained.

Further, the invention uses in the stretching step a couple of vertical and lateral four rolls to provide a gap at a center to meet the reduction of the wire. At least one roll is driven to reduce the stretched material on its four sides. The rolls of the same structure are disposed in a series, and driven such that the rolling speed is increased in response to the reduction rate, whereby the rollings are continuously performed on the four faces from the stretched material until determined dimensions. The obtained fine wires are subjected to particular rolls which are formed with knot imprinting grooves and changed in the reduction rate in circumferential direction.

By the present process, all problems may be solved which have been involved about the producing steps having been necks in the steel fibers of the cut wire type, high production cost and strengthening characteristics.

DETAILED DESCRIPTION OF THE PREFERRED EMBODIMENTS

Figure 1:
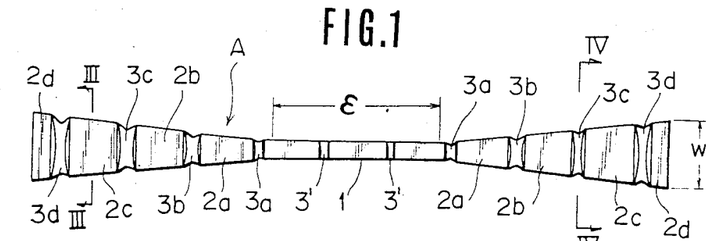
FIG. 1 is a plan view showing one example of a concrete reinforcing steel fiber in dependence upon the invention.
Figure 2:
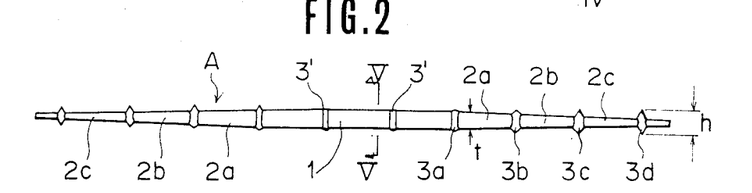
FIG. 2 is a side view of the same.
Figure 4:
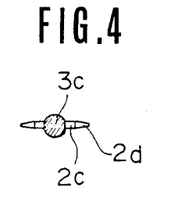
FIG. 4 is a cross sectional view along IV—IV in FIG. 1.
Figure 5:
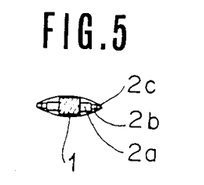
FIG. 5 is a cross sectional view along V—V in FIG. 2.
Figure 6:
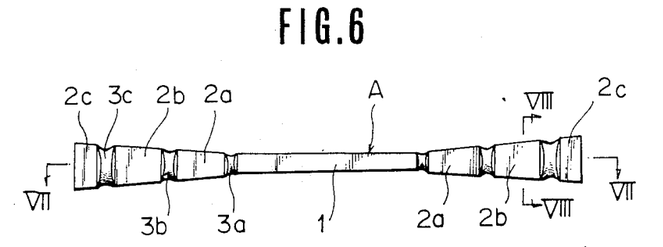
FIG. 6 is a plan view showing the other example of the invention.
Figure 7:
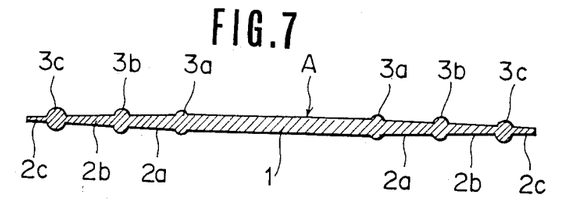
FIG. 7 is a cross sectional view along VII—VII in FIG. 6.
Figure 8:
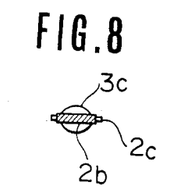
FIG. 8 is a cross sectional view along VIII—VIII in FIG. 6.

The present invention will be explained in preferred embodiments with reference to the attached drawings. FIGS. 1 to 5 show one example of the concrete reinforcing steel fiber by the invention. FIGS. 6 to 8 show the other example of the same. In the drawings, "A" designates an entire body of short steel fiber of wire cut type according to the invention. The numeral 1 is a shaft portion which is formed at the center and in length of the fiber and where deformation is available under elongation. This portion has circular cross section (FIG. 6) or rectangular cross section (FIG. 1) almost equal to that of the raw material. Its surface is perfectly flat as shown in FIG. 6 or is formed equidistantly with small concaves and convexes 3' as shown in FIG. 1. This shaft portion 1 is soft where elongation of 10 to 25% is available, and its length is proper in around ⅓ of the full length of the fiber and may be varied to the extent of around ½ to ¼ in accordance with necessary strength of the reinforced concrete.

2a, 2b, 2c . . . are knots which are symmetrically formed from said shaft portion 1. The knots 2a, 2b, 2c . . . protrude in width (lateral) of the fiber, and the protruding amount (width: w) becomes gradually increased as going from the shaft portion to the ends in length, while thickness t becomes gradually decreased. Seeing from the plan view, the fiber is narrow at the center, and expanded towards the both ends in length.

Figure 3:
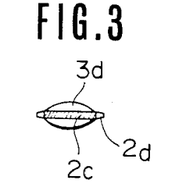
FIG. 3 is a cross sectional view along III—III in FIG. 1.

3a, 3b, 3c . . . are knots formed between the knots 2a, 2b, 2c . . . and protrude in thickness (vertical). In FIGS. 3 to 5, they protrude almost in trapezoid or triangle from the surface of the knots 2a, 2b, 2c . . . In an embodiment shown in FIGS. 6 to 8, the side is almost in arc. The knots 3a, 3b, 3c . . . in thickness are equal in the protruding height h over the full length, but since the thickness t of the knots 2a, 2b, 2c . . . in width become gradually smaller in taper towards the ends parts in length, the protruding amount substantially increase as going thereto. The knots expanding in thickness are curved so that both sides are low and a center part is high.

An explanation will be made to services of the concrete reinforcing steel fibers of the invention. Characteristics in general required to the steel fibers are satisfactory strength, smooth dispersion without making fiber balls when putting them to practice, and firm adhesion with the concrete. In the instant products, since the mother material is a rolled steel wire, very high tensile strength os provided. The knots 2a, 2b, 2c . . . in width and the knots 3a, 3b, 3c . . . in thickness are effected with work hardening due to plastic deformation, so that the hardness is sufficient. Since the whole body is in needle-like shape and is formed in flatness by the knots 2a, 2b, 2c . . . in width, the fibers flow sxoothly without twining one another. The shaft portion 1 at the center part of the fiber is lower in hardness than others, but it is thick with enough rigidity. Therefore, when the steel fibers are thrown into the liquid concrete in lump, they rapidly disperse without maldistributing and are uniformly mixed.

The steel fiber of the invention is not only formed with concaves and convexes (or indents) in thickness or width thereof but formed with knots 2a, 2b, 2c . . . 3a, 3b, 3c . . . in both of thickness and width, and these knots become larger as going to the ends in length of the fiber. Therefore the adhesion with the concrete is very high, and since the knots 2a, 2b, 2c . . . and knots 3a, 3b, 3c . . . in width and thickness grow larger towards the length, an anchoring effect is satisfactory and drawing resistance is large.

The adhering strength of the fiber is different in the combining conditions with the concrete matrix so that the drawing strength is largely changed. That is, assuming that the length of the steel fiber is l, the width is $t_1$, the thickness is $t_2$, the adhering strength of the surface area is $P(Kg/mm^2)$, the drawing strength is $W(Kg)$, and the outer circumference of the cross section perpendicular to length is $L(=2(t_1+t_2))$, the drawing strength of the steel fiber of wire cut type with the smooth surface will be $W=P.L.l/2$, and the adhering strength is solely relative with friction against the concrete.

On the other hand, if the steel fiber is formed, as the invention, with the knots 2a, 2b, 2c . . . in width and the knots 3a, 3b, 3c . . . in thickness, shearing is acted on the concrete by the available concaves and convexes in these two directions, and the areas of the indents which cause the available shearing are relative with the shearing force of the concrete. That is assuming that the width of the available convex (knot in width) is w, the height of the available convex (knot in thickness) is h, the length in the fiber length of the available sheared surface is l/2 at the maximum, and the shearing force of the concrete is $\tau(Kg/mm^2)$, the drawing force will be $W=2\tau(w+h)l/2$ and the adhering force is remarkably increased.

Further, toughness is increased in the reinforced concrete by the drawing resistance, but when the drawing resistance is increased and if the tensile strength is too high and it is uniform over the full length, the combination with the concrete matrix is destroyed and abrupt changing in strength occurs. Such occasion is especially problem in the steel fibers of high tensile strength of wire cut type.

In this point, according to the invention, the knots are not formed over the full length of the fiber, and the shaft portion 1 which is changeable due to elongation is formed at the center part of the fiber. This shaft portion 1 is without any indents as concaves and convexes at all or very little if any, and therefore the adhesion is controlled by the friction against the concrete, and since this portion is hardly effected with plastic working and remains as the mother material, it is easily deformed. Therefore, when the concrete is broken, the shaft portion 1 serves as slipping or free portion, and it is deformed due to elongation and broken before the combination of the anchoring part and the concrete matrix is destructed. The combining parts drop off one by one stepwise and all the knots are not destructed. Thus the toughness of the concrete is very satisfactory.

The above mentioned points will be discussed in the relation with the adhering strength. Assuming that the available cross sectional area of the steel fiber is a (mm$^2$), the tensile stress perpendicular to length of the fiber is $\sigma t$(kg/mm$^2$), the tensile strength is Wf(kg), and the drawing strength is W(kg), the present invention enables to provide W>Wf(=a$\sigma t$) by preparing the shaft portion 1 at the center in length of the fiber which is deformed under elongation. Since the adhering strength is made larger than the tensile strength of the fiber such that the latter is not unnecessarily made larger than the former, the combination of the fiber with the concrete matrix is not broken when destructing the concrete, and the abrupt change of the load is not caused.

Figure 9:
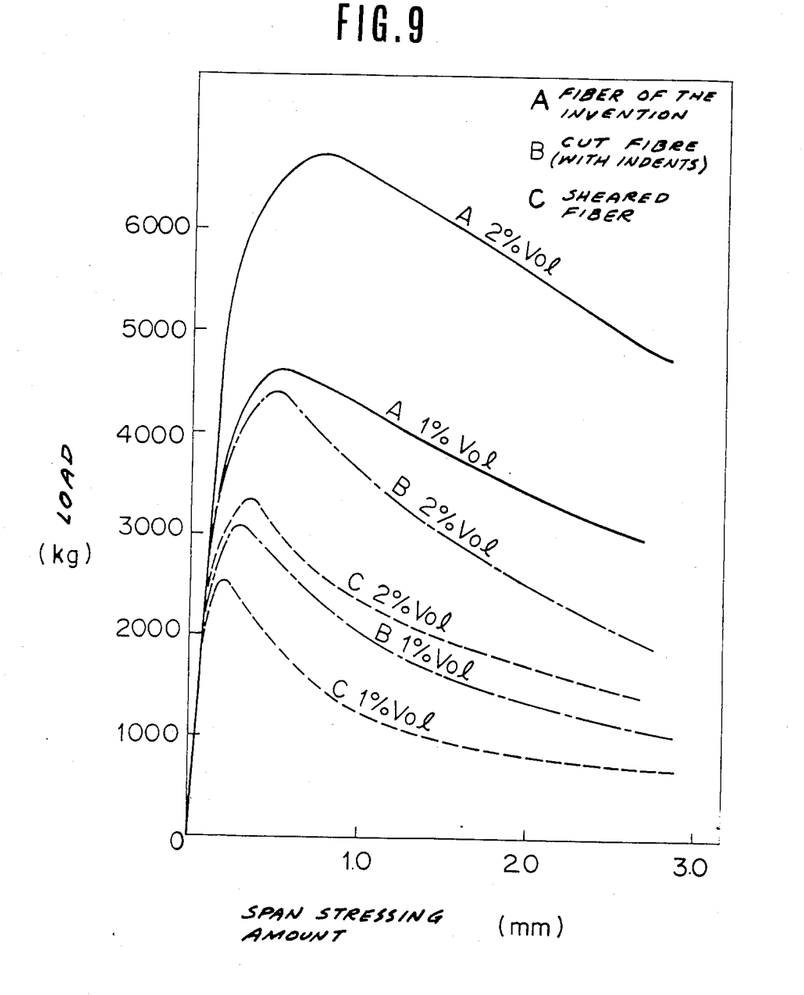
FIG. 9 is a graph showing relation between bending load and deformation when the bending tensts were made on the concretes mixed with the steel fibers of the invention and the conventional ones.

In FIG. 9, the steel fibers of l=30 mm, W=1.6 mm, h=0.7 mm, a=0.28 mm$^2$ and $\epsilon$=10 mm were mixed in the liquid concrete of W/C=50% and the reinforced concrete of 10×10×30 cm were made and subjected to the bending test. The data of the bending test were compared with those of the conventional wire cut fiber and the sheared fibers. From FIG. 9, it is seen that the present invention is well satisfied in strength and toughness.

A further explanation will be made to a producing process of the above mentioned steel fibers.

FIGS. 10 to 15 show an embodiment of producing process of the steel fibers comprising a step of rolling a raw material into fine wires, a step of imprinting the shaft portions and knots on the wires, and a step of cutting the fibers to determined length.

Figure 10:
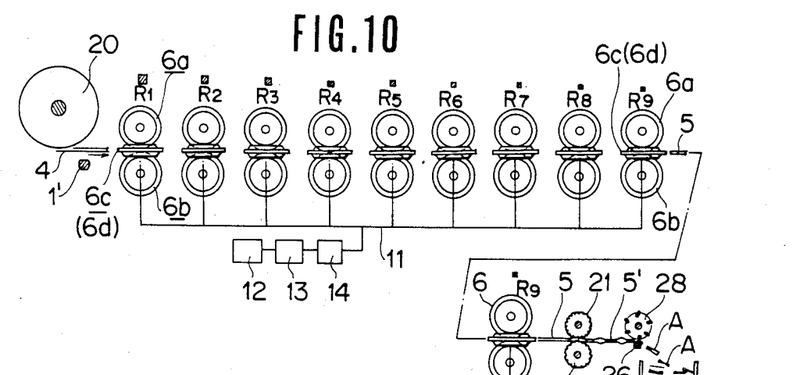
FIG. 10 is a side view showing an outline of a process of producing the concrete reinforcing steel fibers in dependence upon the invention.
Figure 11:
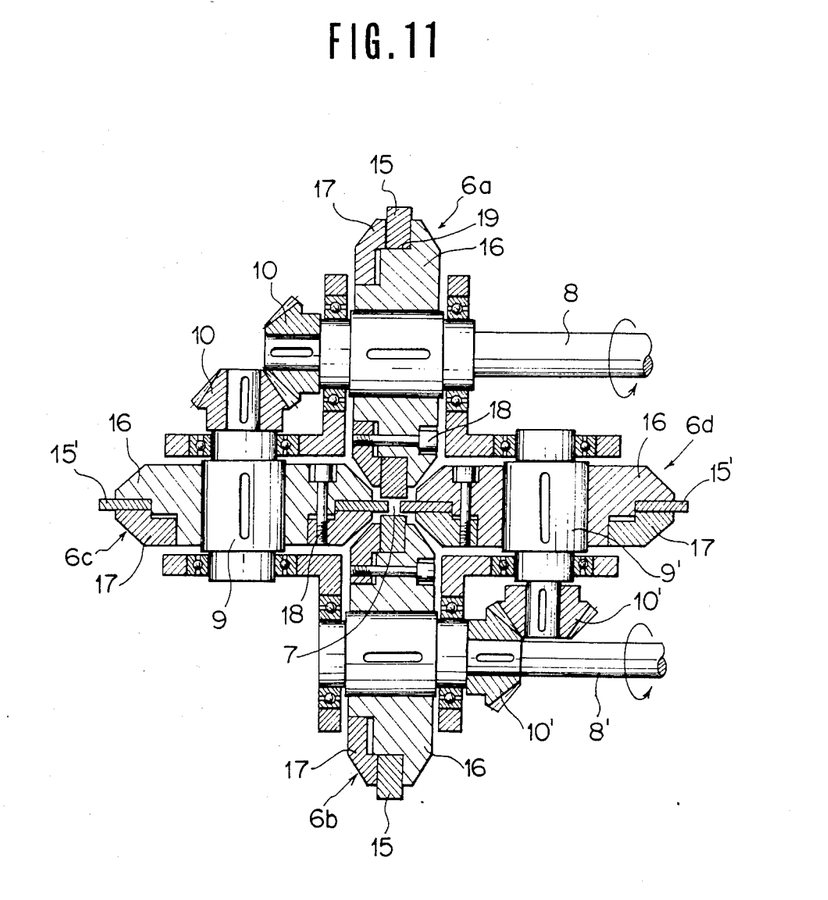
FIG. 11 is a cross sectional view showing one part of producing fine wires.
Figure 12:
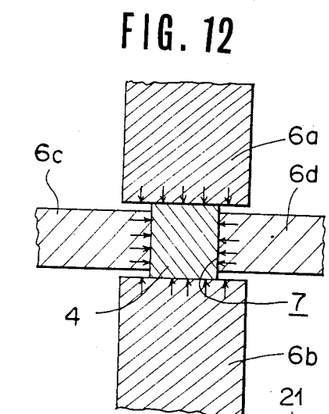
FIG. 12 is a cross sectional view of making fine wires by means of a group of rolls.

The first step will be stated. The numeral 4 is a stretched raw material, and a process for obtaining this material is not specified, and it is enough to roll to 5 to 6 mm in diameter through an ordinary manner. For producing the fine wires 5 from the raw material, the present invention undertakes special multi-rolling. In FIG. 10, R$_1$ to R$_9$ are the multi-rolls disposed in series. As shown in FIGS. 11 and 12, one group comprises four opposite rolls of vertical and lateral rolls. A center between the vertical rolls 6a, 6b and the lateral rolls 6c, 6d is formed with a rectangular gap 7 for providing a determined reduction rate. The rectangular gaps become smaller in size as going to the latter rolls, since the rolls 6a to 6d are reduced in thickness, and the two couples of the rolls are overlapped by proper amount in order to increase rigidity of the rolls and prevent occurance of surplus. In those shown, the vertical rolls 6a, 6b are thicker than the lateral rolls 6c, 6d and the formers keep the latters therebetween.

One couple of the rolls is composed of the four rolls in the multi-rolls R$_1$ to R$_9$, and at least one is a drive roll to be driven at determined speed by means of a servo motor (not shown). In those shown, a shaft 8 of the upper roll 6a and a shaft 9 of the left roll 6c are, as a rotation transmitting mechanism, engaged by bevel gears 10, 10 and a shaft 8' of the lower roll 6b and a shaft 9' of the right roll 6d are enaged by a bevel gear 10', and shafts 8, 8' of the vertical rolls 6a, 6b are engaged by spur gears (not shown) gearing each other.

Each unit of the multi-rolls R$_1$ to R$_9$ is driven and controlled such that the rolling speed is controlled in response to the reduction rate. Motors driving the rolls of the respective steps are combined via a control system 11 to give rotation number in response to deformation rate in the cross sectional areas of the wire materials, to a controller 14 via a setting device 12 and a calculator 13.

For producing fine wires of around 0.6 mm, one side of the rectangular gap 7 is around 0.5 mm at the last stage, and it is rather difficult to meet the specified size. It is desirable for solving this problem to compose one unit with the four rolls 6a to 6d which make one couple. This unit comprises rolls 15, 15' of ring shape, which have been subjected to quenching and surface-grinding, upper and lower pressers 16, 17 supporting the ring shaped rolls 15, 15' therebetween, and bolts 18 securing the pressers 16, 17. The presser 16 is fixed to the shaft by a key and is fitted to the ring shaped roll 15 by a boss 19 of large diameter. Depending upon this manner, the rolls are very easily controlled in thickness for forming small gap, and rectangular gaps of high precision may be provided by simple surface grinding.

The multi-rolls R$_1$ to R$_9$ are driven, and the wire material 4 is inserted into the rectangular gap 7 of the rolls R$_1$ of the first step, whereby the wire material 4 is rolled on its four sides at the same time by rotation of the the vertical and lateral rolls 6a to 6d. Wires of rectangular and reeuced cross sectional areas are produced, and go to the second step of the rolls R$_2$. Herein also, since a rectangular gap is formed in accordance with a determined reduction and the rotation number is increased to heighten the rolling speed, the rolling is done on the four sides by means of the four rolls of one group, and subsequently rollings are successively carried out in the third step of the rolls R$_3$ and in the fourth step of the rolls R$_4$..., and required products run out from the final step of the rolls R$_9$ as fine wires 5.

The above mentioned fine wire making process does not reduce the cross section by drawing the wire material as conventionally, but makes reduction by compressing on the four sides by means of the four rolls, i.e., depending upon the plastic working. Therefore the reduction rate may be made large and the drawing step is not required at an intermediate, so that the processing speed can be increased with the low driving force.

Figure 13:
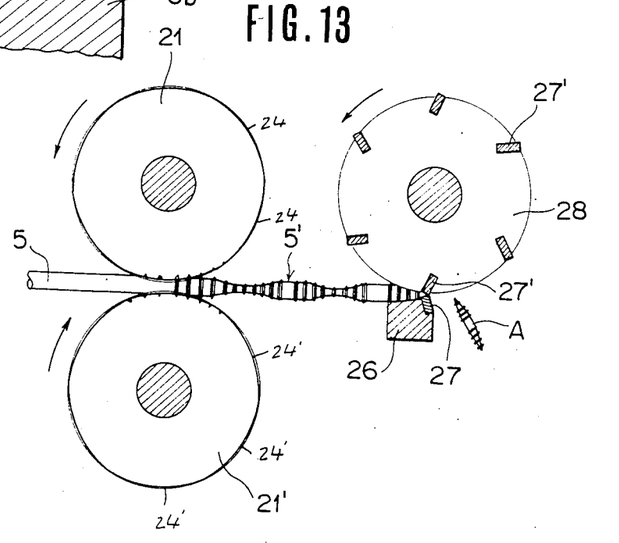
FIG. 13 is a side view showing a process of producing fibers of particular shape and a process of cutting them.
Figure 14:
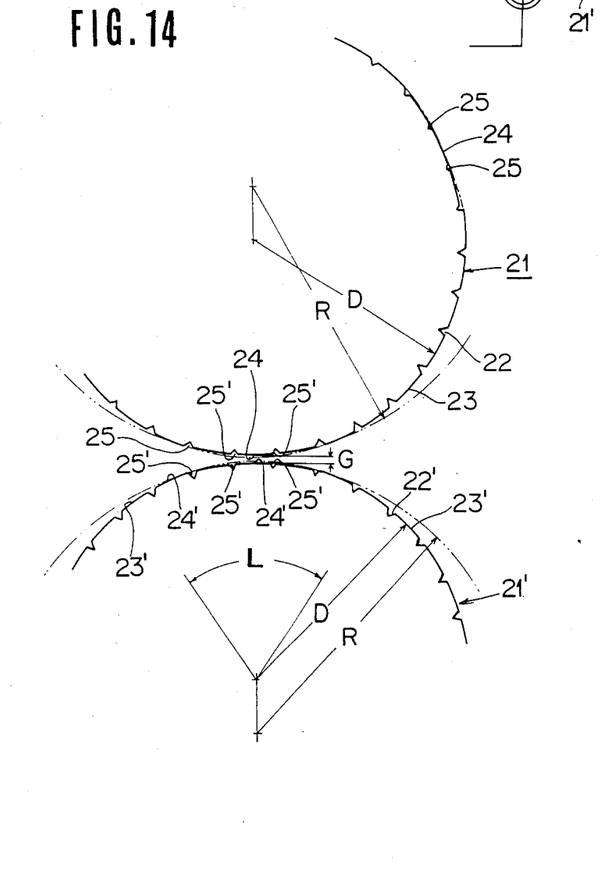
FIG. 14 is a side view, partially in section, forming particular shape.

Going to a next step of imprinting a shaft portion and knots, the present invention is featured in this step by using a couple of special forming rolls 21, 21'. As shown in FIGS. 13 and 14, the forming rolls 21, 21' have determined diameter D and are formed with knot imprinting grooves 22, 22' on the surfaces 23, 23' of the rolls. In this embodiment, the knot imprinting groove is formed in such as 90° V-cut, but no limitation is made thereto. The forming rolls 21, 21' of diameter D are the same as the conventional indent processing rolls, and the fine wires 5 are rolled in uniform thickness (diameter) over the full length and formed with simple knots in thickness. In this regard, the invention changes the reduction rate of the forming rolls 21, 21' by fixed ranges on the circumference, which rolls have the knots imprinting grooves 22, 22' by determined pitch. As shown in FIG. 14, the roll surfaces 23, 23' of the range L corresponding to the circumferential length which is shorter than the fiber length, are slightly cut by a biasing diameter which is larger than the diameter D of the forming rolls 21, 21', in order to provide equidistantly forming surfaces 24, 24' having knot imprinting grooves 25, 25' which are shallower by the cut amount over the full circumference of the forming rolls 21, 21'. The knot imprinting grooves 25, 25' include those of almost zero depth.

The fine wires 5 run out from the final rolls R$_9$ of the preceding step and are sent to the forming rolls 21, 21' as coiled on a coiling drum or as not coiled. The rolls having round grooves are positioned, if necessary, between the final rolls R$_9$ and the forming rolls 21, 21' in order to finally form circular cross section from the rectangular ones.

Figure 15A:
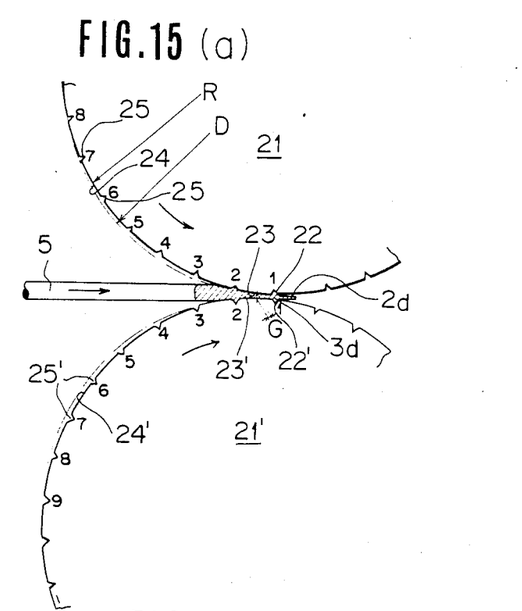
FIGS. 15(a) to 15(d) are explanatory views showing stepwise the processing steps of particular shape.

For processing particular shapes, a standard is made in reference of the forming surfaces 24, 24', and adjustment is made such that roll gap G obtained from said surfaces is almost equal to the diameter or thickness of the fine wires 5. Under this condition, the forming rolls 21, 21' are driven at equal speed into which the fine wires 5 are inserted. In such a manner, the wire 5 is reduced in thickness by the roll surfaces 23, 23' of the diameter D as shown in FIG. 15(a). Since the gap G' by the roll surfaces 23, 23' is smaller than a gap by the forming surfaces 24, 24', the rolling amount of the fine wires 5 is large, and accordingly the thickness is reduced to form knots 2d expanding in flatness. Since the knot impringting grooves 22, 22' are deep, knots 3d are formed which are high and grow in thickness.

Figure 15B:
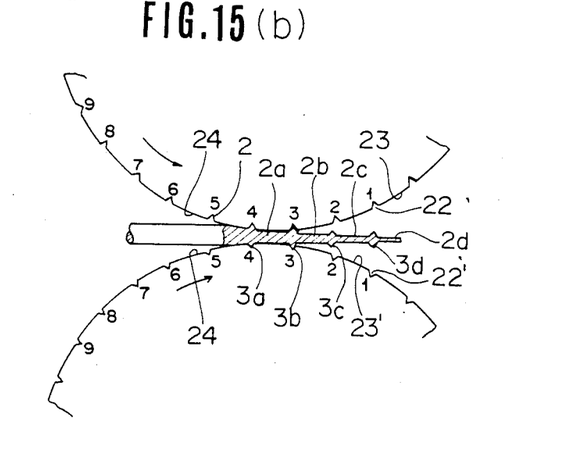

When the wire 5 moves to the axial direction, the reduction amount of the wire 5 is continuously lowered as shown in FIG. 15(b), since the forming surfaces 24, 24' continue from terminations of the roll surfaces 23, 23' of diameter D, and the roll gap is gradually increased. Therefore, the knots 2b 2c expand in width in taper toward the length, and at the same time they decrease in the expanding amount and subsequently knots 3b, 3c are formed in thickness by the knot imprinting grooves 22, 22'.

Figure 15C:
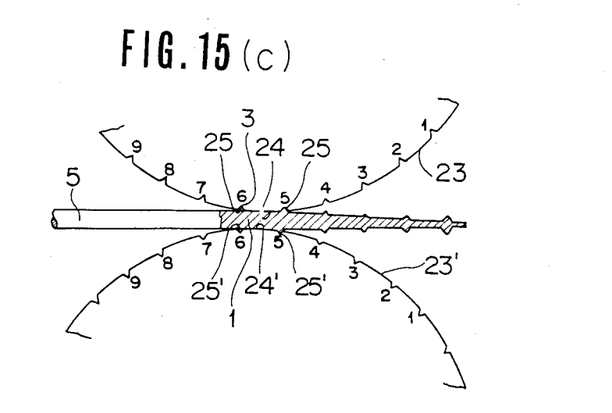

When the wire 5 further moves, the minimum arc regions of the forming surfaces 24, 24' are opposite each other as shown in FIG. 15(c), so that the roll gap is the maximum and the rolling reduction is the minimum, accordingly. In the preceding stage, the wire becomes thicker in taper, and in this stage a shaft portion is formed almost in straight with slight convexes 3'.

Figure 15D:
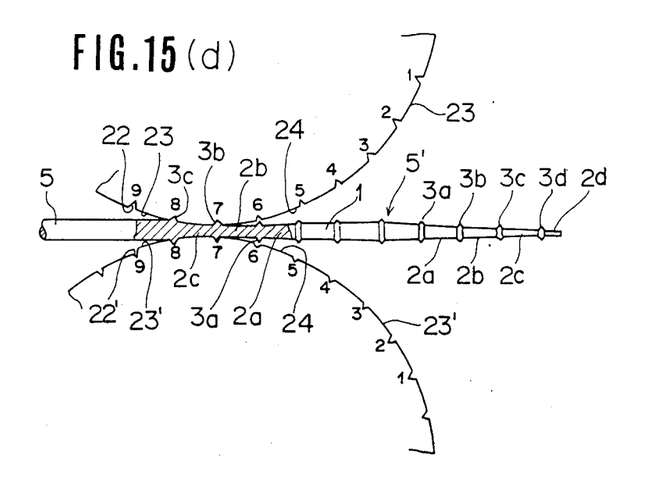

When the forming rolls 21, 21' are further rotated, the roll gap becomes smaller, since the forming surfaces 24, 24' continue to the roll surfaces 23, 23' of diameter D. Thereby the reduction is increased on the wire 5, and it is thin in taper as shown in FIG. 15(d) by reducing with the roll surfaces 23, 23', while knots 2c, 2b, 2a expanding in width are produced successively and knots 3c, 3b, 3a expanding in thickness are produced between the knots 2c, 2b, 2a.

Passing through the same processes, the fine wires are formed with the shaft portion 1 and the knots 2a, 2b, 2c, 3a, 3b, 3c, and the wires of the particular shape are cut in the determined length. This cutting is optional, for example, carried out by stationary die 26 having tips 27 and rotary roll 28 having tips 27' equidistantly on the circumference. Thus, the stee fibers A as shown in FIGS. 1 and 5 are produced.

INDUSTRIAL APPLICABILITY

The steel fibers according to the invention may be used not only to reinforcing materials of the concrete or mortar, but also to those to be mixed in metallurgical refractories. If making diameters thicker, the proposed steel fiber may be substituted for structural iron bars.

What is claimed is:

1. A concrete reinforcing steel fiber of wire cut to be mixed into concrete, comprising a central shaft portion having a length of ½ to ¼ of the full length of the fiber, and two end portions, said two end portions being each formed with a plurality of first knots 2a, 2b, 2c . . . and a plurality of second knots 3a, 3b, 3c . . . , wherein said first knots alternate with said second the knots along each end portion, the width W of each second knot gradually increasing in a direction towards a respective end of the fiber and the thickness t of each first knot gradually decreasing in said direction.

2. Concrete reinforcing steel fiber as claimed in claim 1, wherein the shaft portion is rectangular in cross section.

3. Concrete reinforcing steel fiber as claimed in 1 wherein the shaft portion is circular in cross section.

4. Concrete reinforcing steel fiber as claimed in claim 1, wherein the second knots 3a, 3b, 3c . . . are equal in height over the full length of the fiber.

5. Concrete reinforcing steel fiber as claimed in claim 1, wherein the second knots 3a, 3b, 3c are angular at sides thereof and are largest in arc at the center in a transversal cross section.

6. Concrete reinforcing steel fiber as claimed in claim 1, wherein the second knots 3a, 3b, 3c are curved at sides thereof and in transversal cross section.

* * * * *